(12) United States Patent
Cummings et al.

(10) Patent No.: US 6,194,867 B1
(45) Date of Patent: *Feb. 27, 2001

(54) ADAPTIVE MULTIPLE BATTERY CHARGING APPARATUS

(75) Inventors: John Cummings, Round Rock; Barry Kates, Austin, both of TX (US)

(73) Assignee: Dell USA, L.P., Round Rock, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,165

(22) Filed: Jan. 22, 1999

(51) Int. Cl.$^7$ .................................................. H02J 7/00
(52) U.S. Cl. ...................................... 320/119; 320/124
(58) Field of Search ................................. 320/116, 119, 320/124

(56) References Cited

U.S. PATENT DOCUMENTS

| | | | |
|---|---|---|---|
| 4,160,941 | 7/1979 | Bennett | 320/126 |
| 5,028,859 | * 7/1991 | Johnson et al. | 320/125 |
| 5,376,873 | 12/1994 | Toya | 320/124 |
| 5,440,179 | 8/1995 | Severinsky | 307/66 |
| 5,465,011 | 11/1995 | Miller et al. | 307/64 |
| 5,504,416 | 4/1996 | Holloway et al. | 320/152 |
| 5,532,523 | 7/1996 | Tang | 307/64 |
| 5,543,702 | * 8/1996 | Pfeiffer | 320/110 |
| 5,583,871 | 12/1996 | Simmonds et al. | 320/151 |
| 5,602,462 | 2/1997 | Stich et al. | 323/258 |
| 5,666,006 | * 9/1997 | Townsley et al. | 320/124 |
| 5,698,964 | 12/1997 | Kates et al. | 320/164 |
| 5,717,314 | 2/1998 | Wakefield | 320/116 |
| 5,726,561 | 3/1998 | Ghosh et al. | 323/255 |
| 5,764,030 | 6/1998 | Gaza | 320/116 |
| 5,773,955 | 6/1998 | Hall | 320/104 |
| 5,773,956 | 6/1998 | Wieczorek | 320/152 |
| 5,780,992 | 7/1998 | Beard | 320/106 |
| 5,917,305 | * 6/1999 | Faulk | 320/106 |
| 5,955,867 | * 9/1999 | Cummings et al. | 320/107 |

* cited by examiner

Primary Examiner—Peter S. Wong
Assistant Examiner—Pia Tibbits
(74) Attorney, Agent, or Firm—Skjerven Morrill MacPherson LLP; Stephen A. Terrile; Mary Jo Bertani

(57) ABSTRACT

A battery charging apparatus, computer system and method provide current from a single power line to charge either a first battery or multiple batteries in an independent mode or a simultaneous mode. The apparatus includes an AC-to-DC adapter, the power line, and a battery charging control system that measures the charge of the individual batteries and compares the measured charge. If the charging system detects a difference in charge between the batteries, the lowest or the lower charged batteries are charged until the charging system detects no difference in charge, and then resumes simultaneous charging. The battery charging control system also includes a comparator circuit that determines whether to enable charging in the independent mode or the simultaneous mode based on input from a user or input from a computer system. The computer system includes a processor, a memory, a bus, a power line, and a battery charging apparatus coupled to the power line. The battery charging apparatus capable of simultaneously charging a plurality of batteries with a single power line and allowing current from the power line to charge either a first battery or multiple batteries in either an independent mode or a simultaneous mode. The method includes simultaneously charging a plurality of batteries using a power line, providing a battery charging apparatus with an AC-to-DC adapter and a power line, providing a battery system, and enabling current from the power line to charge either a first battery or a plurality of batteries simultaneously or independently.

42 Claims, 4 Drawing Sheets

ADAPTIVE MULTIPLE BATTERY CHARGING APPARATUS

BACKGROUND OF THE INVENTION

1. Field of the Invention

This invention relates in general to the field of battery charging devices, and more particularly to multiple battery charging devices for electronic devices and computer systems.

2. Description of the Related Art

Portable computers, personal digital assistants (PDA's), cellular telephones, pagers, calculators, and other such electronic devices are commonplace in today's mobile society. One of the reasons portable electronic devices are so popular is that they provide a user with virtual freedom regarding the location of their use, as long as a source of power is readily available. Although these devices may be powered by plugging them into a standard AC outlet, AC power is often not convenient or readily available. Hence, their real portability and utility comes from their being powered by batteries.

Early portable devices relied on rechargeable lead-acid batteries to provide them with power. However, for some devices such as portable computers, the power requirements were so great that the "on-time" of the device, i.e., the useful battery life between charges, was often measured in minutes, rather than hours. In addition, early rechargeable batteries were inefficient at recharging, having recharge times three to four times that of their useful life. For example, one early portable computer manufactured by the assignee of the present invention had an on-time of approximately 45 to 100 minutes, with a recharge time of approximately 6 to 8 hours. For many users, this amounted to an overnight charge to obtain an hour or so of useful life during the day. What was needed was batteries having faster recharge times. Most rechargeable batteries, typically called battery packs, are made of Nickel Cadmium ("NiCad") or Nickel Metal Hydride ("NiMH"), both of which require a constant current in order to charge. In contrast, the Lithium-Ion ("Li-Ion") battery requires a constant voltage in order to charge. These different types of rechargeable batteries terminate charging under different conditions. The NiCad battery terminates charging upon detecting a negative change in voltage; the NiMH battery detects a temperature gradient; and the Li-Ion battery detects a voltage and has a time-out.

Although there have been tremendous improvements in battery technology, other factors important to the marketplace have developed. Users not only want longer life, with shorter recharge times, they also want to be able to quickly charge two or more batteries at the same time.

One solution to the above-stated problem with quickly recharging two or more batteries was to charge two batteries in the same charging apparatus by independently charging a first battery followed by a second battery. With this solution, a single charging system is used to first recharge the first battery, and when the first battery is completely recharged, the charging system would recharge a second battery. Another solution to the above-stated problem with quickly recharging multiple batteries was to charge each battery in a charging system with its own power line or charging system.

However, both solutions present problems. A problem with the first solution is that it is not efficient. The second solution requires a prohibitive amount of space.

For the foregoing reasons, there is a need for an adaptive multiple battery charging apparatus that allows simultaneous charging of multiple batteries with a single battery charging system.

SUMMARY OF THE INVENTION

Accordingly, a battery charging apparatus and method provides simultaneous charging of multiple batteries with a single power line battery charging system. A single power line charges multiple batteries simultaneously so long as all batteries are equally charged. The charging system measures the charge of the individual batteries and compares the measured charge. If the charging system detects a difference in charge between the batteries, a lowest or lower charged battery is charged until the charging system detects no difference in charge, and simultaneous charging resumes.

The battery charging apparatus includes an AC-to-DC adapter to supply power, a power line coupled to the AC-to-DC adapter to supply a current, and a battery system coupled to the AC-to-DC adapter and the power line. The battery system enables the current from the power line to charge either a first battery or multiple batteries in either an independent mode or a simultaneous mode. The battery system also includes a comparator circuit that determines whether to enable charging in the independent mode or the simultaneous mode based on input from a user or input from a computer system.

The computer system includes a processor, a memory coupled to the processor, a bus coupled to both the memory and the processor, a power line coupled to the processor, and a battery charging apparatus coupled to the power line. The battery charging apparatus is capable of simultaneously charging a plurality of batteries with a single power line. The battery charging apparatus allows current from the power line to charge either a first battery or multiple batteries in either an independent mode or a simultaneous mode.

The method includes simultaneously charging a plurality of batteries using a power line. The method further includes providing an AC-to-DC adapter, a power line coupled to an AC source and coupled to the AC-to-DC adapter, and a battery system coupled to the AC-to-DC adapter and the power line. The method includes enabling the current from the power line to charge one of a first battery and a plurality of batteries in one of an independent mode and a simultaneous mode.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out the embodiments described. The description is intended to be illustrative of the invention and should not be taken to be limiting.

Figure 1:
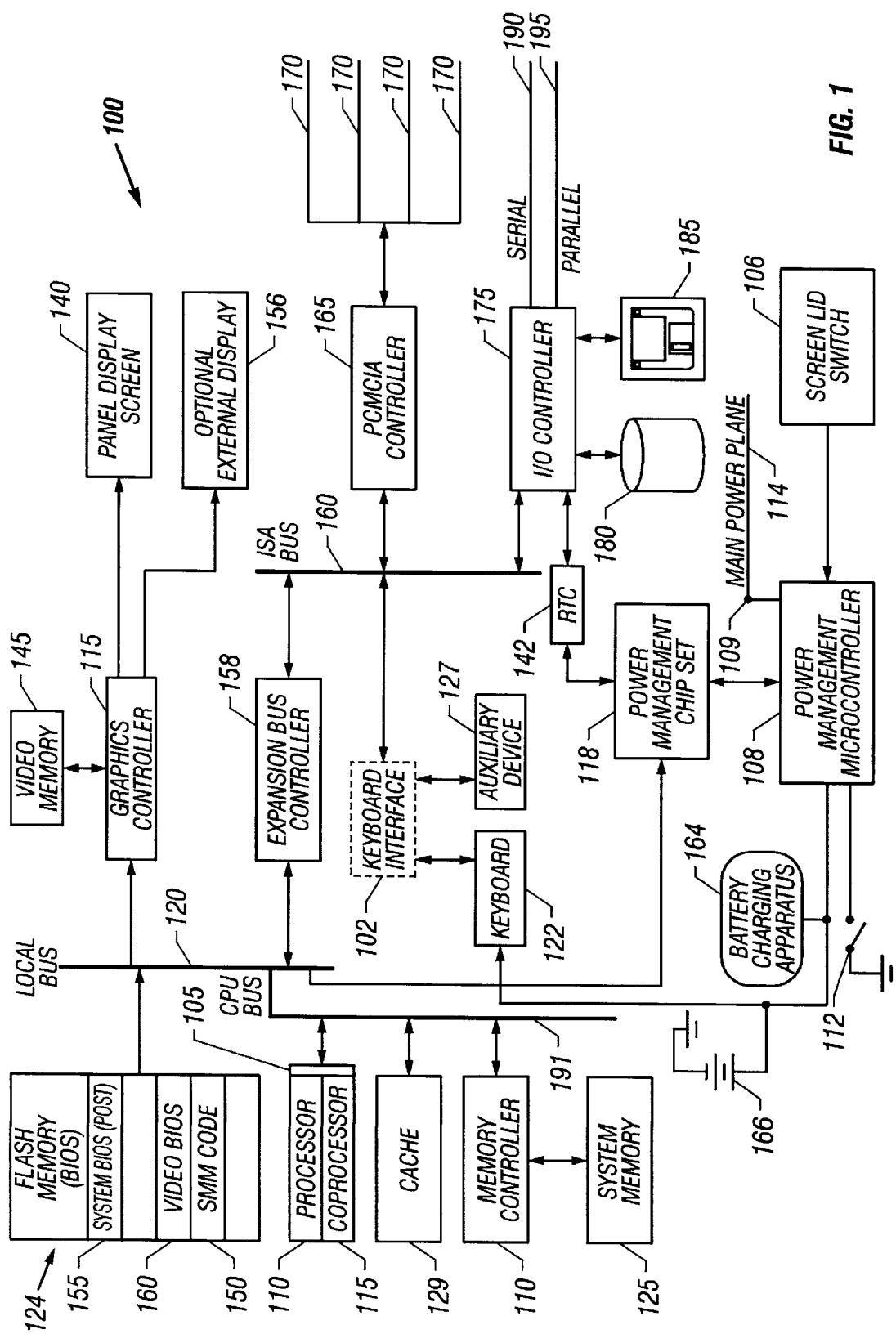
FIG. 1 is a perspective view of a computer system that includes a multiple battery charging system in accordance with an embodiment of the present invention.

Referring to FIG. 1, an embodiment of a computer system 100 is shown. The computer system 100 includes a microprocessor 105 which is coupled to cache 120 and memory controller 110 via the processor bus ("CPU bus") 191. The computer system 100 also includes a system memory 125 of dynamic random access memory ("DRAM") modules coupled to memory controller 110. Computer system 100 also includes a Basic Input Output system ("BIOS") memory 124 coupled to local bus 120. A FLASH memory or other nonvolatile memory is used as BIOS memory 124. BIOS memory stores the system code.

A graphics controller 115 is coupled to a local bus 220 and to a panel display screen 140. Graphics controller 115 is coupled to video memory 145 and stores information to be displayed on panel display screen 140. Panel display 140 is typically an active matrix or passive matrix liquid crystal display ("LCD") although other display technologies may be used as well.

A bus interface controller or expansion bus controller 158 couples the local bus 120 to an expansion bus, shown as an Industry Standard Architecture ("ISA") bus, but could be represented as a Peripheral Component Interconnect ("PCI") bus. A Personal Computer Memory Card International Association "PCMCIA" controller 165 is also coupled to the expansion bus 160. An I/O controller 175 is coupled to the expansion bus 160 as well. The I/O controller 175 interfaces to Integrated Drive Electronics ("IDE") hard drive 180 and to floppy drive 185.

The computer system 100 includes a power supply 166, shown in FIG. 1 as a battery, which provides power to the many devices that form the computer system 100. Computer system 100 is shown embodied as a portable or notebook computer. Thus, power supply 166 is typically a rechargeable battery, such as Nickel Cadmium ("NiCad"), Nickel Metal Hydride ("NiMH"), or Lithium-Ion ("Li-Ion"). The power supply 166 is coupled to a power management microcontroller 108 that controls the distribution of power from the power supply 166 to power planes (not shown) that supply power to different devices. The power management microcontroller 108 monitors the charge level of the power supply 166 to determine when to charge and when not to charge the battery 164. Power management microcontroller 108 is coupled to a main power switch 112 that the user actuates to turn the computer system on and off. When the power management microcontroller 108 powers down other parts the of the computer system 100 to conserve power, the power management microcontroller 108 itself remains coupled to a source of power, here shown as the power supply 166.

The power management microcontroller 108 is coupled to battery charging apparatus 164, which may be located either internally or externally to the computer system. The computer system may include a notebook or portable computer system. The battery charging apparatus 164 is capable of simultaneous and independent charging of a plurality of batteries, and is part of a battery system that includes an AC-to-DC adapter (not shown) and a power line. The power line is an output power line from either the power management microcontroller 108 or from a microcontroller located inside the battery charging apparatus 164. The current from the power line charges the plurality of batteries either in an independent mode or a simultaneous mode as explained in further detail below.

Figure 2:
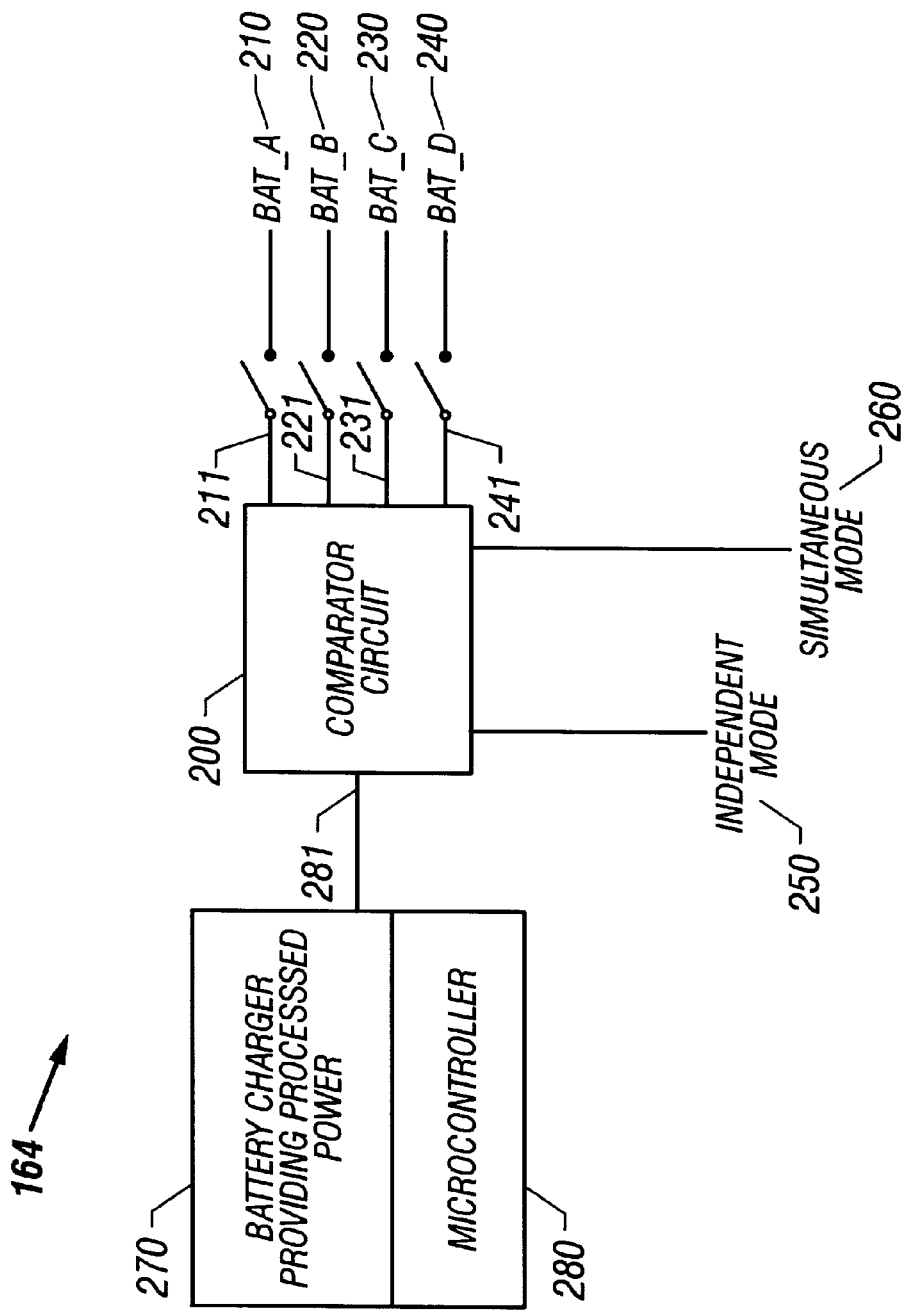
FIG. 2 is a block diagram showing a multiple battery charging system that is used in the computer system shown in FIG. 1.

Referring to FIG. 2, a block diagram shows the battery charging apparatus 164 that charges batteries in either an independent mode or the simultaneous mode. The battery charging apparatus 164 includes a battery charger 270 and may include a battery charging microprocessor 280 having an output terminal connected to a processed power line 281. The battery charger 270 is coupled to an AC-to-DC adapter 280, which is coupled to a power source (not shown) such as a wall outlet AC source.

The processed power line 281 is coupled to comparator circuit 200. Comparator circuit 200 is coupled to two select lines, an independent mode select line 250, and a simultaneous mode select line 260. A user or an automatic detection circuit asserts one of these select lines 250 or 260 and determines the mode of operation for the battery charging apparatus 164. Coupled to the comparator circuit 200, are four batteries, shown as BAT_A 210, BAT_B 220, BAT_C 230 and BAT_D 240. Although four are shown, one skilled in the art using the information disclosed herein could readily extend the embodiments described to any number of batteries. In addition, the batteries used in the battery charging apparatus 164 could have the same cell configuration and end point voltage, or the batteries could have different battery cell configurations and the same end point voltage. For example, assuming each battery has an end point voltage of 17 Volts, two of the batteries could have a 12 cell battery configuration with 4 cells in series and 3 cells in parallel, and two of the batteries could have an 8-cell battery configuration with 4 cells in series and 2 cells in parallel. Alternatively, all four batteries could have the same cell battery configuration and the same end point voltage.

Coupled between batteries 210, 220, 230 and 240 are switches 211, 221, 231 and 241. The comparator circuit 200 operates the switches according to the mode selected, either independent mode 250 or simultaneous mode 260.

Asserting the independent mode select line 250 selects an independent mode of operation for the battery charging apparatus 164. Independent mode permits batteries coupled to the comparator circuit 200 to be charged one at a time by closing the appropriate switch, either 211, 221, 231 or 241.

Asserting the simultaneous mode select line 260 allows a plurality of batteries coupled to the comparator circuit 200 to be charged at the same time by closing switches 211, 221, 231 and 241. Closing the switches couples the batteries 210, 220, 230, and 240 to the processed power line 281. However, if at any time during simultaneous mode the comparator circuit 200 detects a differential charge between any batteries coupled to the comparator circuit 200, the comparator circuit 200 opens the switches to the higher charged batteries and allows charging of only the lowest charged battery or subset of batteries, thereby preventing current from flowing from one battery to another battery. The lowest charged battery is charged until it reaches the charge of another battery or a subset of batteries. The lower charged batteries are then simultaneously charged and the process repeated until all batteries hold the same charge, at which time simultaneous charge is resumed by closing all switches to the batteries. Thus, asserting simultaneous mode 260 allows simultaneous charging but also allows single battery charging when necessary to equalize the charge on all batteries being charged.

Figure 3:
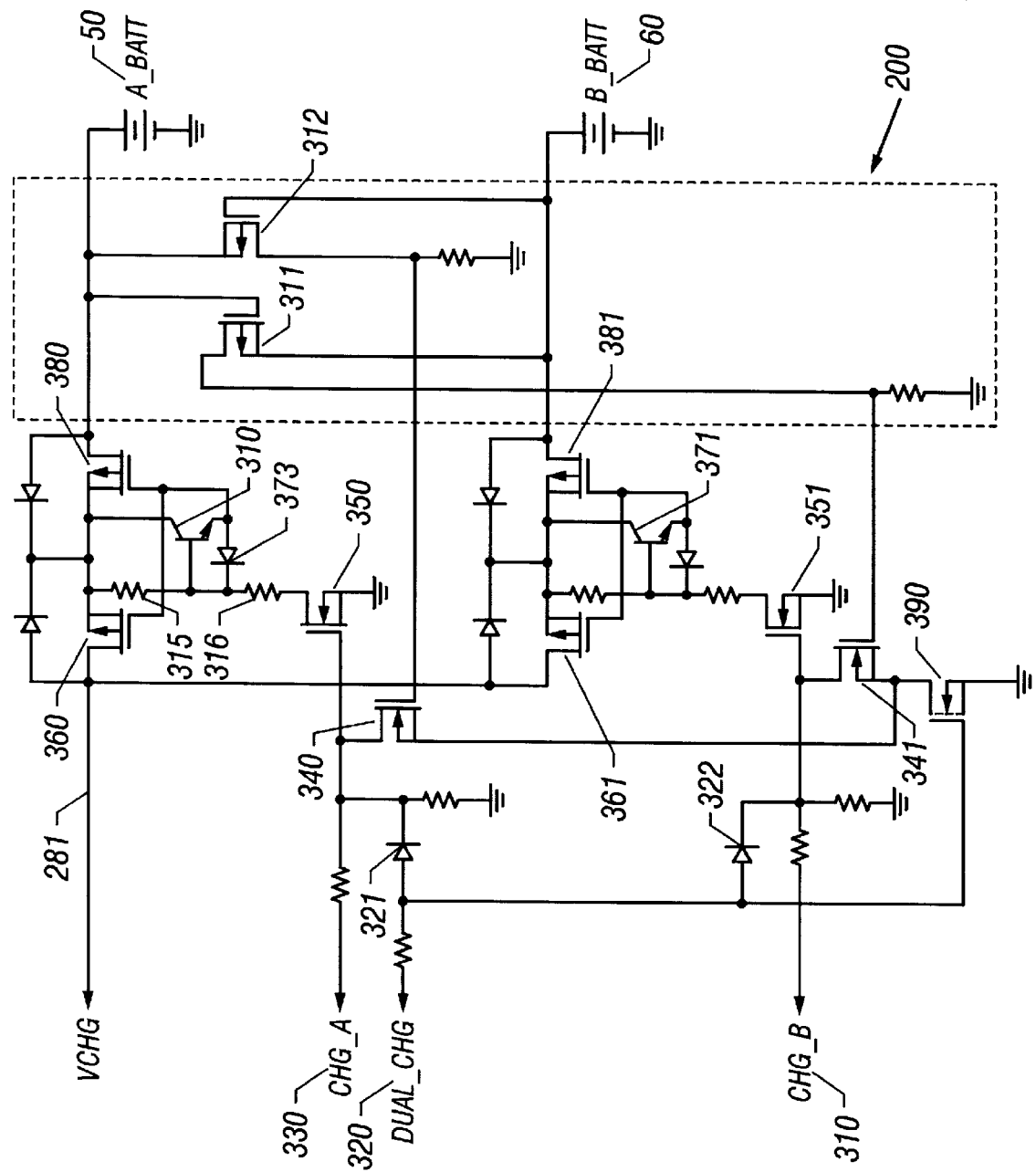
FIG. 3 is a schematic diagram illustrating suitable circuitry for use in a multiple charging system.

FIG. 3 is a schematic diagram showing the battery charging apparatus 164. Unlike prior systems, in which batteries are independently charged using a charging apparatus, the battery charging apparatus 164 uses a comparator circuit 200 that allows simultaneous charging of multiple batteries using the same processed power line. For example, the same processed power line 281 shown in FIG. 2 is used to charge both "A_BATT" 50 and "B_BATT" 60. The comparator circuit 200 represents ideal transistors and it is understood that one skilled in the art given the information herein presented is sufficiently capable of using appropriate comparator circuitry.

The schematic shown in FIG. 3 illustrates different charging capabilities. First, in a condition in which the battery charging apparatus holds a single battery, 50, marked "A_BATT", a user or computer system asserts select line 330, labeled "CHG_A" or an automatic detection circuit detects a single battery in the "A_BATT" 50 location of the battery charging apparatus. Asserting select line 330 or automatically detecting a single battery in the system is akin to asserting the "independent mode 250" referred to above with respect to FIG. 2. The signal present on line 330 reaches n-channel Metal Oxide Field Effect Transistor ("FET") 350, which is "on" due to the gate voltage being higher than the source voltage (ground). The voltage at the drain of FET 350 is divided by resistors 315 and 316 and turns "off" bipolar junction transistor 370. The signal has a voltage drop through diode 373 thereby turning "on" p-channel FETs 360 and 380 because the voltage present at the respective sources is higher than the respective gates. When the FETs 360 and 380 are turned "on" by the signal, A_BATT is coupled to the processed power line shown as "VCHG" 281. VCHG" 281 provides processed power from a battery charger (not shown) and in the same manner as the processed power 281 shown in FIG. 2.

The same signal path and circuitry that is present for select line 330 is present regarding select line 310, "CHG_B". Thus, when dual charge is not asserted, asserting "CHG_B" allows the voltage from the power line 281, "VCHG", to flow through to battery 60, "B_BATT".

In a condition in which a user or a computer system asserts line 320, DUAL_CHG", or an automatic detection circuit detects multiple batteries and enables select line 320, "DUAL_CHG", the battery charging system allows simultaneous charging of multiple batteries when the batteries match charges. When a differential charge is present, asserting "DUAL_CHG" automatically charges the lowest charged batteries until the batteries match in charge. When the batteries once again match in charge, the battery charging system resumes simultaneous charge.

As an example, assume A_BATT 50 and B_BATT 60 have the same charge. Following the signal path from "DUAL_CHG", the signal flows through diodes 321 and 322, thereby enabling both signal paths CHG_A 330 and CHG_B 310, discussed above, thereby allowing A_BATT 50 and B_BATT 60 to charge simultaneously. N-channel FETs 390, 340 and 341 remain off.

Assume A_BATT 50 and B_BATT 60 have different charges. As described above, different charges between the batteries can cause cross conduction problems when the same power line charges both batteries. To avoid such problems, the battery charging system compares the voltages and prevents simultaneous charging until the charges between the batteries match.

As shown in the schematic, p-channel FET 311 has its gate coupled to A_BATT 50 and its source coupled to B_BATT 60. In contrast, p-channel FET 312 has the opposite configuration with its gate coupled to B_BATT 60 and its source coupled to A_BATT 50. With this configuration, given that p-channel FETs are used, the FETs are "off" unless the gate voltage is below the source voltage. If the gate voltage is higher than the source voltage, the drain has the same voltage as that of the gate. Thus, for example, if the charge on B_BATT 60 is less than the charge on A_BATT 50, the voltage at the drain of the p-channel FET 312 is the voltage on B_BATT 60.

Referring again to FIG. 3, assume A_BATT 50 has a higher charge than B_BATT 60. In this scenario, p-channel FET 312 is "on" as soon as a voltage differential is detected because the gate is coupled to B_BATT 60 and the source is coupled to A_BATT 50, and the gate is lower than the source. With FET 212 "on", the path for VCHG 281 to charge A_BATT 50 is blocked. N-channel FET 340 turns "on" when the gate voltage is higher than the source, allowing only B_BATT to charge until the gate and source for FET 212 match in voltage. Once the voltages match, simultaneous charging resumes.

When the charge of A_BATT 50 is less than the charge of B_BATT 60, FET 311 instead of FET 312 turns "on". Similarly, FET 341 instead of FET 340 turns "on", thereby allowing A_BATT 50 to charge alone until the charges on the batteries match. Only when the charges of the batteries A_BATT 50 and B_BATT 60 match do the n-channel FETs 350 and 351 turn "on".

Figure 4:
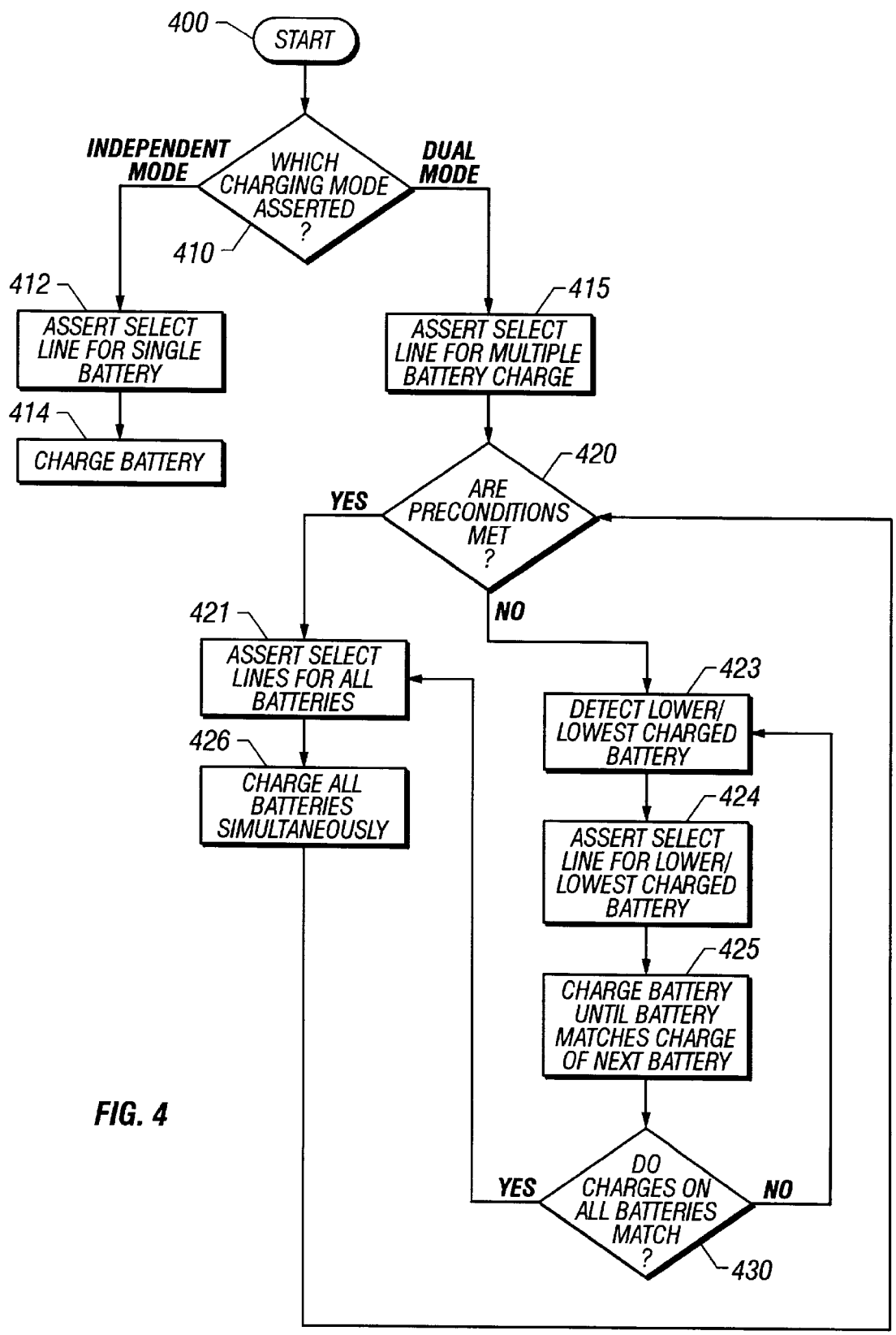
FIG. 4 represents a charging method used in the multiple charging system.

Referring to FIG. 4 in combination with FIG. 2, a method for charging multiple batteries using the same processed power line is shown. A computer system performs the method without a computer user's involvement, or a user may perform selected steps of the method. If a computer system performs the method, the Power Management Microcontroller 108 discussed above in reference to FIG. 1 includes software and hardware enabling the computer system to perform portions of the method. Additionally, in an embodiment not requiring user involvement, system BIOS software performs selected steps of the method.

The method begins with "start" step 400 at which point the battery charging apparatus 164 detects a battery or multiple batteries. At "which charging mode asserted?" step 410, either a user or a computer system asserts a mode of operation for the battery charging apparatus 164. If the computer system or user asserts independent mode from decision 410, then the select line asserted in step 412 selects the independent mode, shown in FIG. 2 as select line 250. Asserting select line 250 causes a single battery to charge in step 414.

If at step 410, a computer system or user asserts the simultaneous mode, then the select line for simultaneous mode 260 is asserted at step 415. The next step in the method 420 determines whether the system meets the preconditions for simultaneous charging. The preconditions are based on the comparative charge levels of the batteries in the battery charging apparatus 164. If each battery does not have the same charge, then the battery charging system detects, in step 423, the lower or lowest charged battery. In step 424, the charging system enables only the select line for the lower or lowest charged battery in the battery charging apparatus 164. In one embodiment, the charging system disables all but the lower or lowest charged battery or batteries in the battery charging apparatus 164. In step 425 of the method, the lowest charged battery is charged until the charge on the battery is no longer the lowest charged battery. In one embodiment, in a multiple battery charging apparatus step 425 allows for multiple low-charged batteries to charge while the system reasserts charging capability for higher charged batteries. When all batteries in the system have the same charge as determined in step 430, then the preconditions are met and the method proceeds to step 421 wherein the system asserts the select lines for all the batteries in the battery charging apparatus 164, and in step 426 all batteries charge simultaneously.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. A battery charging apparatus for charging a plurality of batteries comprising:
   an AC-to-DC adapter capable of supplying power to the plurality of batteries;
   a single power line coupled to the AC-to-DC adapter capable of supplying a current to the plurality of batteries; and
   a single power line coupled to the AC-DC adapter capable of supplying a current to the plurality of batteries; and
   a battery charging control system coupled to the AC-Dc adapter and the power line, the battery charging control system enabling the current from the power line to charge one of a first battery and the plurality of batteries in one of an independent mode and a simultaneous mode.

2. The battery charging apparatus of claim 1, wherein the battery system includes a comparator circuit, the comparator circuit capable of comparing the charge of one of the plurality of batteries and, based on the comparison, determining whether to enable charging in one of the independent mode and the simultaneous mode.

3. The battery charging apparatus of claim 2, wherein the comparator circuit determines whether to enable charging in one of the independent mode and the simultaneous mode based on one of input from a user and input from a computer system coupled to the battery charging apparatus.

4. The battery charging apparatus of claim 1 wherein the independent mode directs the battery system to detect the one of the first battery and the plurality of batteries, and permits the battery system to charge the first battery and to charge the plurality of batteries sequentially.

5. The battery charging apparatus of claim 1 wherein the simultaneous mode:
   directs the battery system to detect the one of the first battery and the plurality of batteries;
   compares the charge of the detected batteries to determine the relative charge of the detected batteries; and
   permits the battery system to charge the first battery and to charge the plurality of batteries simultaneously when the plurality of batteries are equally charged.

6. The battery charging apparatus of claim 5 wherein when the plurality of batteries are unequally charged, the simultaneous mode directs the battery system to charge only a first subset among one of a single or plurality of subsets of the plurality of batteries, the first subset having a lower charge than the balance of the plurality of batteries, until the first subset reaches the charge of one of the balance of the plurality of batteries and another subset of the plurality of batteries.

7. The battery charging apparatus of claim 6 wherein the simultaneous mode directs the battery system to charge one of the plurality of batteries and a second subset of the plurality of batteries including the first subset of the plurality of batteries together with a third subset of the plurality of batteries simultaneously after charging the first subset of the plurality of batteries to a point at which the first subset of the plurality of batteries reaches the charge of one of the third subset of the plurality of batteries and the plurality of batteries.

8. The battery charging apparatus of claim 7 wherein the simultaneous mode directs the battery system to charge the plurality of batteries, the first subset of the plurality of batteries, the second subset of the plurality of batteries, and the third subset of the plurality of batteries by closing appropriate switches coupled between the power line and the plurality of batteries.

9. The battery charging apparatus of claim 1 wherein in the simultaneous mode the battery system charges the plurality of batteries simultaneously until the plurality of batteries is fully charged.

10. The battery charging apparatus of claim 1 wherein the plurality of batteries is one of Nickel Cadmium, Nickel Metal Hydride and Lithium-Ion type.

11. The battery charging apparatus of claim 1 wherein the battery system is coupled to a microcontroller, the microcontroller receiving signals from one of a computer system basic input/output system (BIOS) and keyboard input.

12. The battery charging apparatus of claim 1 wherein the battery charging apparatus further comprises:
   a microcontroller coupled to the power line, the microcontroller providing a processed power line to the battery system.

13. The battery charging apparatus of claim 1 further comprising:
   a plurality of switches, each switch coupled between a battery among the plurality of batteries and the power line, the switches closing when simultaneous mode is asserted.

14. The battery charging apparatus of claim 1 further comprising:
   a plurality of switches, each switch coupled between a battery among the plurality of batteries and the power line, the switches closing when simultaneous mode is asserted and the plurality of batteries have the same charge.

15. The battery charging apparatus of claim 1 further comprising:
   a plurality of switches, each switch coupled between a battery among the plurality of batteries and the power line, one of the plurality of switches closing when independent mode is asserted.

16. A computer system comprising:
   a processor;
   a memory coupled to the processor;
   a bus coupled to both the memory and the processor;
   a single power line coupled to the processor;
   a battery charging apparatus coupled to the power line, the battery charging apparatus capable of simultaneously and independently charging a plurality of batteries with a single power line, the battery charging apparatus charging simultaneously when the battery charging apparatus detects that the plurality of batteries have substantially the same charge, the battery charging apparatus charging independently when the battery charging apparatus detects that the plurality of batteries have dissimilar charge.

17. The computer system of claim 16 wherein the battery charging apparatus includes an AC-DC adapter capable of supply power to the plurality of batteries, the AC-to-DC adapter coupled to the battery charging apparatus, a power line coupled to an AC source and coupled to the AC-to-DC adapter, the power line capable of supplying a current to the plurality of batteries, and a battery charging control system coupled to the AC-to-DC adapter and the power line, the battery system enabling the current from the power line to charge one of a first battery and the plurality of batteries in one of an independent mode and a simultaneous mode.

18. The computer system of claim 17, wherein the battery system includes a comparator circuit, the comparator circuit capable of comparing the charge of one of the plurality of batteries and, based on the comparison, determining whether to enable charging in one of the independent mode and the simultaneous mode based on one of input from a user and input from the computer system coupled to the battery charging apparatus.

19. The computer system of claim 17 wherein the independent mode directs the battery system to detect one of the first battery and the plurality of batteries, and permits the battery system to charge the first battery and to charge the plurality of batteries sequentially.

20. The computer system of claim 17 wherein the simultaneous mode:
 directs the battery system to detect one of the first battery and the plurality of batteries;
 compares the charge of the detected batteries to determine the relative charge of the detected batteries; and
 permits the battery system to charge the first battery and to charge the plurality of batteries simultaneously when the plurality of batteries are equally charged.

21. The computer system of claim 20 wherein when the plurality of batteries are unequally charged, the simultaneous mode directs the battery system to charge only a first subset among one of a single or plurality of subsets of the plurality of batteries, the first subset having a lower charge than the balance of the plurality of batteries, until the first subset reaches the charge of one of the balance of the plurality of batteries and another subset of the plurality of batteries.

22. The computer system of claim 21 wherein the simultaneous mode directs the battery system to charge one of the plurality of batteries and a second subset of the plurality of batteries including the first subset of the plurality of batteries together with a third subset of the plurality of batteries simultaneously after charging the first subset of the plurality of batteries to a point at which the first subset of the plurality of batteries reaches the charge of one of the third subset of the plurality of batteries and the plurality of batteries.

23. The computer system of claim 22 wherein the simultaneous mode directs the battery system to charge the plurality of batteries, the first subset of the plurality of batteries, the second subset of the plurality of batteries, and the third subset of the plurality of batteries by closing appropriate switches coupled between the power line and the plurality of batteries.

24. The computer system of claim 17 wherein, in the simultaneous mode, the battery system charges the plurality of batteries simultaneously until the plurality of batteries is fully charged.

25. The computer system of claim 17 wherein the plurality of batteries is one of Nickel Cadmium, Nickel Metal Hydride and Lithium-Ion type.

26. The computer system of claim 17 wherein the battery system is coupled to a microcontroller, the microcontroller receiving signals from one of a computer system basic input/output system (BIOS) and keyboard input.

27. The computer system of claim 17 wherein the battery charging apparatus includes a microcontroller coupled to the power line, the microcontroller providing a processed power line to the battery system.

28. The computer system of claim 17 further comprising:
 a plurality of switches, each switch coupled between a battery among the plurality of batteries and the power line, the switches closing when simultaneous mode is asserted.

29. The computer system of claim 17 further comprising:
 a plurality of switches, each switch coupled between a battery among the plurality of batteries and the power line, the switches closing when simultaneous mode is asserted and the plurality of batteries have the same charge.

30. The computer system of claim 17 further comprising:
 a plurality of switches, each switch coupled between a battery among the plurality of batteries and the power line, one of the plurality of switches closing when independent mode is asserted.

31. A method of charging batteries in a battery charging apparatus comprising:
 simultaneously and independently charging a plurality of batteries with a single power line, the battery charging apparatus charging simultaneously when the battery charging apparatus detects that the plurality of batteries have substantially the same charge, the battery charging apparatus charging independently when the battery charging apparatus detects that the plurality of batteries have dissimilar charge.

32. The method of charging batteries of claim 31 further comprising:
 including in the battery charging apparatus an AC-to-DC adapter, a power line coupled to an AC source and coupled to the AC-to-DC adapter, and a battery system coupled to the AC-to-DC adapter and the power line; and
 enabling the current from the power line to charge one of a first battery and a plurality of batteries in one of an independent mode and a simultaneous mode.

33. The method of charging batteries of claim 32 further comprising:
 including a comparator circuit in the battery system; and
 determining via the comparator circuit whether to enable charging in one of the independent mode and the simultaneous mode.

34. The method of charging batteries of claim 32 further comprising:
 directing the battery system when in independent mode, to detect one of the first battery and the plurality of batteries, and permits the battery system to charge the first battery and to charge the plurality of batteries sequentially.

35. The method of charging batteries of claim 32 further comprising:
 directing the battery system, when in the simultaneous mode, to detect one of the first battery and the plurality of batteries, and permitting the battery system to charge the first battery and to charge the plurality of batteries simultaneously when the plurality of batteries are equally charged.

36. The method of charging batteries of claim 35 further comprising:
 directing the battery system when in simultaneous mode and when the plurality of batteries are unequally charged, to charge only a first subset among one of a single or plurality of subsets of the plurality of batteries, the first subset having a lower charge than the balance of the plurality of batteries, until the first subset reaches the charge of one of the balance of the plurality of batteries and another subset of the plurality of batteries.

37. The method of charging batteries of claim 36 further comprising:

directing the battery system when in the simultaneous mode to charge one of the plurality of batteries and a second subset of the plurality of batteries including the first subset of the plurality of batteries together with a third subset of the plurality of batteries simultaneously after charging the first subset of the plurality of batteries to a point at which the first subset of the plurality of batteries reaches the charge of one of the third subset of the plurality of batteries and the plurality of batteries.

38. The method of charging batteries of claim 37 further comprising:

directing the battery system when in the simultaneous mode to charge the plurality of batteries, the first subset of the plurality of batteries, the second subset of the plurality of batteries, and the third subset of the plurality of batteries by closing appropriate switches coupled between the power line and the plurality of batteries.

39. The method of charging batteries of claim 32 further comprising:

coupling a microcontroller to the battery system, the microcontroller receiving signals from one of a computer system basic input/output system (BIOS) and keyboard input.

40. The method of charging batteries of claim 32 further comprising:

providing a processed power line to the battery system, the processed power line output from a microcontroller coupled to the battery system.

41. The method of charging batteries of claim 32 further comprising:

providing a plurality of switches, each switch coupled between a battery among the plurality of batteries and the power line; and closing the switches when simultaneous mode is asserted.

42. The method of charging batteries of claim 32 further comprising:

providing a plurality of switches, each switch coupled between a battery among the plurality of batteries and the power line; and closing the switches when simultaneous mode is asserted and the plurality of batteries have the same charge.

* * * * *